(12) United States Patent
To et al.

(10) Patent No.: US 11,252,016 B2
(45) Date of Patent: Feb. 15, 2022

(54) ANOMALY DETECTION AND CLASSIFICATION IN NETWORKED SYSTEMS

(71) Applicant: Microsoft Technology Licensing, LLC, Redmond, WA (US)

(72) Inventors: Philip To, Lexington, MA (US); Steven Rhejohn Barlin So, Billerica, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 119 days.

(21) Appl. No.: 16/662,844

(22) Filed: Oct. 24, 2019

(65) Prior Publication Data

US 2020/0136890 A1    Apr. 30, 2020

Related U.S. Application Data

(60) Provisional application No. 62/749,944, filed on Oct. 24, 2018.

(51) Int. Cl.
*H04L 12/24* (2006.01)
*G06N 20/00* (2019.01)
*G06K 9/62* (2006.01)
*H04L 12/26* (2006.01)

(52) U.S. Cl.
CPC .......... *H04L 41/064* (2013.01); *G06K 9/6267* (2013.01); *G06N 20/00* (2019.01); *H04L 43/04* (2013.01)

(58) Field of Classification Search
CPC ..... H04L 43/04; H04L 41/064; G06K 9/6267; G05B 23/0218; G06N 20/00
See application file for complete search history.

(56) References Cited

U.S. PATENT DOCUMENTS

| | | | |
|---|---|---|---|
| 9,628,362 B2 * | 4/2017 | Vasseur | H04L 43/08 |
| 9,838,409 B2 * | 12/2017 | Flacher | H04L 63/1458 |
| 2015/0254330 A1 * | 9/2015 | Chan | G06F 16/219 707/613 |
| 2017/0104773 A1 * | 4/2017 | Flacher | H04L 63/1458 |
| 2017/0344901 A1 * | 11/2017 | Ronen | H04L 63/1425 |

(Continued)

OTHER PUBLICATIONS

International Search Report and Written Opinion as issued by the European Patent Office as International Searching Authority in International Application No. PCT/US19/57881, dated Jan. 28, 2020 (16 pages).

(Continued)

*Primary Examiner* — Philip J Chea
*Assistant Examiner* — Mohammed Ahmed
(74) *Attorney, Agent, or Firm* — Ray Quinney & Nebeker P.C; James Bullough

(57) ABSTRACT

Systems and methods are disclosed for detecting and classifying faults in a networked system. An offline training offline storage and training function can store network data and periodically train machine learning models for identifying faults. Machine learning models can include separate detection and classification models. These machine learning models can be periodically provided to an online anomaly detection function and an online anomaly classification function for detecting and classifying anomalies in real time.

20 Claims, 4 Drawing Sheets

(56) References Cited

U.S. PATENT DOCUMENTS

| | | | |
|---|---|---|---|
| 2019/0149565 A1* | 5/2019 | Hagi | G06N 20/00 |
| | | | 726/23 |
| 2019/0361466 A1* | 11/2019 | Obropta, Jr. | G05D 1/0088 |
| 2019/0385070 A1* | 12/2019 | Lee | G06N 20/00 |
| 2020/0067952 A1* | 2/2020 | Deaguero | G06F 21/552 |
| 2020/0150159 A1* | 5/2020 | Takeda | G01M 99/00 |
| 2020/0151577 A1* | 5/2020 | Ogawa | G06N 5/046 |

OTHER PUBLICATIONS

J. Hochenbaum, et al., "Automatic Anomaly Detection in the Cloud Via Statistical Learning", arXiv:1704.07706v1 [cs.LG], available at https://arxiv.org/pdf/1704.07706.pdf, submitted Apr. 24, 2017 (13 Pages).

* cited by examiner

ANOMALY DETECTION AND CLASSIFICATION IN NETWORKED SYSTEMS

CROSS-REFERENCE TO RELATED APPLICATIONS

This application claims the benefit under 35 U.S.C. § 119(e) to U.S. Provisional Application No. 62/749,944, entitled "ANOMALY DETECTION AND CLASSIFICATION IN NETWORKED SYSTEMS," filed on Oct. 24, 2018, the content of which is incorporated by reference herein in its entirety.

TECHNICAL FIELD

The present disclosure relates generally to detecting and classifying anomalies in networked systems, and more particularly to a system architecture and method for implementing machine learning models for accomplishing the same.

BACKGROUND

Wireless network operators face many challenges when operating and maintaining their networks. The methodologies used by operators in most cases are outdated and inefficient. For example, some network operators rely on static thresholds for recognizing abnormal resource usage. However, most abnormal network behaviors that manifest themselves as spikes may not trigger such thresholds. In order to catch these and other patterns, some operators employ network monitor teams, who visually inspect the resource usage for abnormal behavior. If there is a large number of network parameters to monitor, such as key performance indicators ("KPIs"), it can take a lot of time to collect and plot the data, and can involve a lot of human resources to inspect and investigate for anomalies. In addition, humans may not be good at spotting abnormal trends, such as those that grow over time or those that are too small for the human eye to catch. This can lead to delay in identifying potential problems, which can impact end user experience or leave the anomaly undetected until it causes a more significant problem.

SUMMARY

In some embodiments, a method includes receiving, at an online computing node, network data from a plurality of nodes in the networked system, the network data comprising information about performance of the networked system; parsing, by the online computing node, the received network data into at least one network data set, the parsing the network data comprising: identifying, by the online computing node, at least one subset of the received network data based on at least one parsing criteria, for each of the at least one subset of the received network data, packaging, by the online computing node, the subset of the received network data as components of the at least one network data set, and associating the at least one network data set with at least one timestamp; detecting in real time, by an anomaly detection function ("ADF") in the online computing node, whether data packaged in the at least one network data set is anomalous based on at least one anomaly detection model, the at least one anomaly detection model comprising: at least one detection machine learning model stored in the online computing node, and at least one set of anomaly detection parameters associated with the at least one detection machine learning model; tagging the at least one network data set containing anomalous data with an anomaly tag; providing, to an online anomaly classification function ("ACF") in the online computing node, the at least one tagged network data set; determining in real time, by the ACF, if the at least one tagged network data set matches an anomaly type based on at least one anomaly classification model, the at least one anomaly detection model comprising: at least one classification machine learning model stored in the online computing node, and at least one set of anomaly classification parameters associated with the at least one classification machine learning model; periodically transmitting, by the online computing node, the at least one network data set to an offline storage and training function (OSTF); storing, by the OSTF, the at least one network data set from the online computing node; periodically training, by a machine learning training engine (MLTE) in the OSTF, one or more of at least one updated anomaly detection model on the at least one stored network data set to identify at least one set of updated anomaly detection parameter or at least one updated anomaly classification model on the at least one stored network data set to identify at least one set of updated anomaly classification parameters; and providing an update message to the online computing node, the update message comprising one or more of: instructions to the ADF to replace the at least one set of anomaly detection parameters with the at least one set of updated anomaly detection parameters, or instructions to the ACF to replace the at least one set of anomaly classification parameters with the at least one set of updated anomaly classification parameters.

In some embodiments, the instructions to the ADF to replace the at least one set of anomaly detection parameters with the at least one set of updated anomaly detection parameters comprises the at least one set of updated anomaly detection parameters, wherein the update message does not contain a detection machine learning model.

In some embodiments, the instructions to the ACF to replace the at least one set of anomaly classification parameters with the at least one set of updated anomaly classification parameters comprises the at least one set of updated anomaly classification parameters, wherein the update message does not contain a classification machine learning model.

In some embodiments, the method further includes storing, at the online computing node, one or more of a plurality of generic detection machine learning models or a plurality of generic classification machine learning models; and wherein the update message further comprising one or more of: instructions to the ADF to utilize at least one of the stored generic detection machine learning models of the stored generic detection machine learning models in place of the at least one detection machine learning model, or instructions to the ADF to utilize at least one of the stored generic classification machine learning models of the plurality of the stored generic classification machine learning models in place of the at least one classification machine learning model.

In some embodiments, the method further includes cross-validating the at least one set of updated anomaly detection parameters and the at least one set of anomaly classification parameters based on at least a portion of the at least one network data set stored by the OSTF.

In some embodiments, one or more of the at least one detection machine learning model and the at least one classification machine learning model comprises one or more of a K-Nearest Neighbor, Support Vector Machines, Naive Bayes, clustering, or K-means clustering model.

In some embodiments, the ACF is further configured to provide information about at least one of the detected at least one tagged network data set and the determined anomaly type to an action block, the action block being configured to perform at least one of a network adjustment or a notification to a system operator.

In some embodiments, the OSTF is remote from the online computing node.

In some embodiments, the method further includes transmitting, to at least one network operator, an anomaly report based on one or more of the at least one tagged network data set or the determined anomaly type.

In some embodiments, the at least one network data set comprises at least one network data vector.

In some embodiments, a system includes an online computing node in a networked system comprising an anomaly detection function (ADF) and an anomaly classification function (ACF), the online computing node configured to: receive network data from a plurality of nodes in the networked system, the network data comprising information about performance of the networked system; parse, by the online computing node, the received network data into at least one network data set, the parsing the network data comprising: identify, by the online computing node, at least one subset of the received network data based on at least one parsing criteria, for each of the at least one subset of the received network data, package, by the online computing node, the subset of the received network data as components of the at least one network data set, and associate the at least one network data set with at least one timestamp; detect in real time, by the ADF, whether data packaged in the at least one network data set is anomalous based on at least one anomaly detection model, the at least one anomaly detection model comprising: at least one detection machine learning model stored in the online computing node, and at least one set of anomaly detection parameters associated with the at least one detection machine learning model; tag the at least one network data set containing anomalous data with an anomaly tag; provide, to the ACF, the at least one tagged network data set; determine in real time, by the ACF, if the at least one tagged network data set matches an anomaly type based on at least one anomaly classification model, the at least one anomaly detection model comprising: at least one classification machine learning model stored in the online computing node, and at least one set of anomaly classification parameters associated with the at least one classification machine learning model; periodically transmit, by the online computing node, the at least one network data set to at least one offline storage and training function (OSTF); an OSTF comprising a machine learning training engine (MLTE), the OSTF configured to: receive the at least one network data set from the online computing node; store the at least one network data set from the online computing node; periodically train, by the MLTE, one or more of at least one updated anomaly detection model on the at least one stored network data set to identify at least one set of updated anomaly detection parameter or at least one updated anomaly classification model on the at least one stored network data set to identify at least one set of updated anomaly classification parameters; and provide an update message to the online computing node, the update message comprising one or more of: instructions to the ADF to replace the at least one set of anomaly detection parameters with the at least one set of updated anomaly detection parameters, or instructions to the ACF to replace the at least one set of anomaly classification parameters with the at least one set of updated anomaly classification parameters.

In some embodiments, the instructions to the ADF to replace the at least one set of anomaly detection parameters with the at least one set of updated anomaly detection parameters comprises the at least one set of updated anomaly detection parameters, wherein the update message does not contain a detection machine learning model.

In some embodiments, the instructions to the ACF to replace the at least one set of anomaly classification parameters with the at least one set of updated anomaly classification parameters comprises the at least one set of updated anomaly classification parameters, wherein the update message does not contain a classification machine learning model.

In some embodiments, the online computing node is further configured to: store one or more of a plurality of generic detection machine learning models or a plurality of generic classification machine learning models; and wherein the update message further comprising one or more of: instructions to the ADF to utilize at least one of the stored generic detection machine learning models of the stored generic detection machine learning models in place of the at least one detection machine learning model, or instructions to the ADF to utilize at least one of the stored generic classification machine learning models of the plurality of the stored generic classification machine learning models in place of the at least one classification machine learning model.

In some embodiments, the OSTF is further configured to cross-validate the at least one set of updated anomaly detection parameters and the at least one set of anomaly classification parameters based on at least a portion of the at least one network data set stored by the OSTF.

In some embodiments, one or more of the at least one detection machine learning model and the at least one classification machine learning model comprises one or more of a K-Nearest Neighbor, Support Vector Machines, Naive Bayes, clustering, or K-means clustering model.

In some embodiments, the ACF is further configured to provide information about at least one of the detected at least one tagged network data set and the determined anomaly type to an action block, the action block being configured to perform at least one of a network adjustment or a notification to a system operator.

In some embodiments, the OSTF is remote from the online computing node.

In some embodiments, the online computing node is further configured to transmit, to at least one network operator, an anomaly report based on one or more of the at least one tagged network data set or the determined anomaly type.

In some embodiments, the at least one network data set comprises at least one network data vector.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
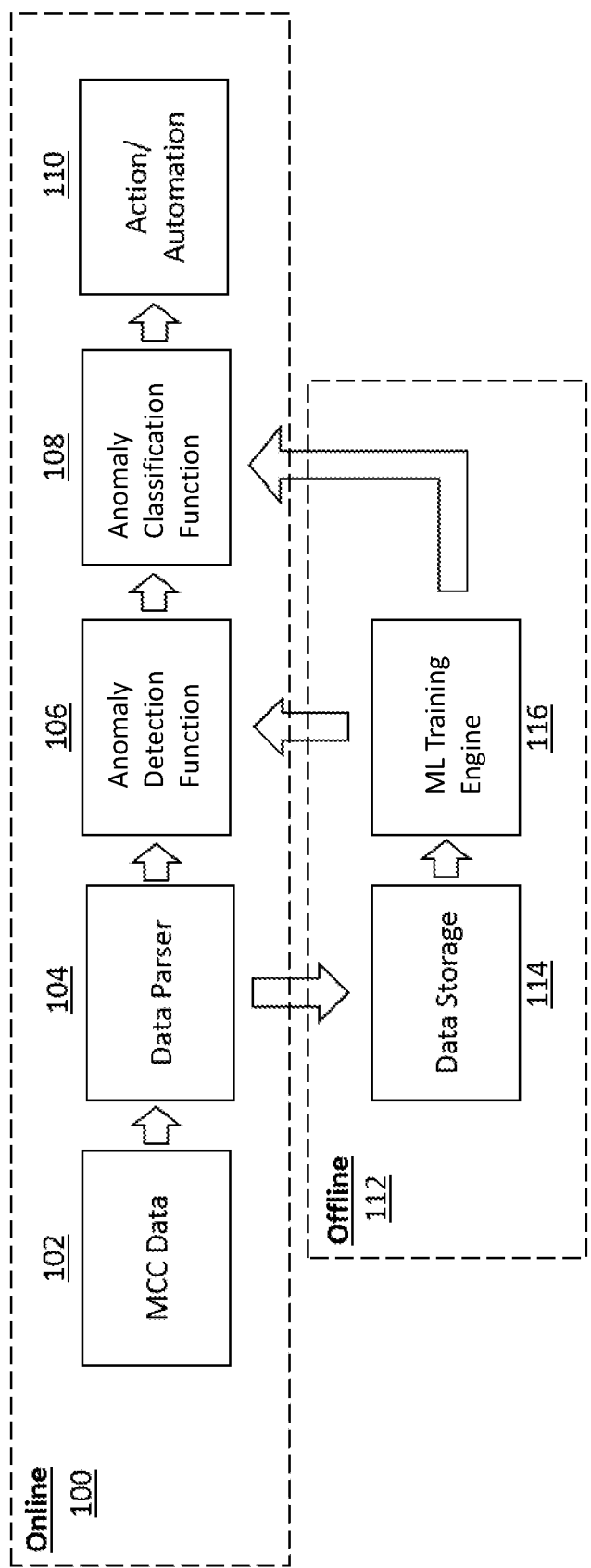
FIG. 1 is a block diagram of an architecture for implementing machine learning in a network, in accordance with some embodiments of the disclosed subject matter.

Implementing an efficient system design for anomaly detection and classification that is computationally and spatially lightweight, such as for applications in telecommunications networks and in the core-network, faces many challenges. For example, storing mass amounts of data in existing network components can be expensive. Using such large datasets to train and test machine learning models requires large amount of computational power, which can lead to a decrease in performance to the overall system. In some implementations, there is a tradeoff between implementing a system that contains both the training and testing of machine learning models without diverting too many network resources to such training and testing. Accordingly, in some embodiments, it is desirable to implement such systems on a network architecture that can better handle the demands associated with implementing large scale machine learning.

According to some embodiments, the disclosed systems, methods, and computer readable mediums are capable of a hierarchical mechanisms of machine learning modules to proactively identify anomalies and predict potential issues. In some embodiments, the disclosed machine learning architecture can be further implemented to (1) alert operators; (2) pinpoint possible causes of the issues; and (3) fix issues autonomously, all while being spatially and computationally lightweight in existing network components. In order to better serve some of these goals, a separate offline storage and training function (OSTF) can be implemented. The OSTF can be considered to be offline because it is does not process or act on data in real time. Instead, the OSTF can receive and process network data offline at a time that is more convenient for the network operator (e.g., when system resources utilization is at a minimum) in order to develop and refine anomaly detection and classification algorithms. These can then be provided back, for example, automatically, to online network functions in order to detect, classify, and/or remedy anomalies. In some embodiments, one or more of the anomaly detection and classification algorithms can be parameterized into a predetermined set of parameters (e.g., a set of weights and numbers that define the specific implantation of the algorithm) such that updating the OSTF only requires transmission of the parameters and reconfiguration of the online system to apply such parameters, rather than transmission of an entire file containing every detail of the anomaly detection and classification algorithm after each update. For example, the OSTF may train various coefficients (e.g., predetermined set of parameters) in a general machine learning model. If the online system already contains a file with the general machine learning model, the OSTF can send only the parameters associated with a specific implementation of the machine learning model to the online system in order to communicate a new detection/classification algorithm or an update to an existing algorithm. In some embodiments, by implementing the OSTF and corresponding detection, classification, and remedy elements in the online network, problems can be identified early before they cause significant strain on the network or on the user experience.

In some embodiments, metrics can be collected on the network node level and fed into a machine learning engine to look for abnormal behavior. Some example non-limiting metrics include, but are not limited to, a number of successful or failed attempts made for a given function, call, and/or communication; CPU and/or memory utilization; etc. The engine can apply algorithms to gain insight on metrics beyond a signal node at a single point in time, for example where metrics from multiple nodes are correlated together or where anomalous trends in one or more metrics are identified over time. To pinpoint potential causes of the abnormal behavior, multiple metrics can be correlated together to help pinpoint the root cause. This can allow the operator to focus resources on the right metrics to quickly detect an anomaly and prevent an issue, such as a system or node crash causing customers to lose access, from happening. Since machine learning techniques can efficiently utilize a large number of metrics, they save time and resources relative to visual inspection of the data to spot trends and anomalies and can provide a fuller coverage of different areas of performance relative to more simplistic techniques such as threshold monitoring.

The following are non-limiting examples that can be subjected to machine learning:

Latency:

In some embodiments, latency can be an indicator of potential problems. Latency can refer to the time it takes to perform a certain task, such as sending a communication from one node to another, performing a particular processor task, reading or writing from memory, etc. This can include some or all external and internal latency measurements of all the nodes in the network. If latency is trending up, the network could be becoming congested or software may not be operating properly. Such anomalies can evolve into significant problems down the road. For example, an increase in latency in receiving responses from an external server can indicate that the external server is not keeping up with the offered load. This can be caused, for example, by a new software release used in the external server not performing as well as the previous version. When the latency deteriorated to a point that it exceeds an acceptable threshold, requests to that server may be dropped. This can lead to failure to set up new calls and thus can affect KPIs such as CPU usage, packet drops, call failures, etc. It can therefore be advantageous to detect such latency anomalies early and fix it as soon as possible. In some embodiments, latency can be internal to a network node or external to the network node. Internal latency can refer to latency that is internal to the network node, while external latency can refer to latency between one node and different nodes, such as nodes from other networks. In some embodiments, internal latency in a node can be measured based on amount of time to complete a request or task within the network node. In some embodiments, external latency in a node can be determined for example, as the amount of time required to receive a response from a neighboring node. By correlating various metrics, such as those listed throughout the present disclosure, across nodes in the network, potential problems can be quickly identified and fixed before larger or more systemic problems develop, which can negatively affect customer experience.

Retry Rates:

In some embodiments, retry rates can also indicate potential problems. Retries can be internal and external to a network node. External retries can occur, for example, when a packet is sent but unsuccessfully delivered, or when the receiver can't communicate that the packet was received. Internal retries can occur when a network node fails to complete a task, and can be tracked by the node transmitting a message or request. Anomalies such as rising retry rates can indicate potential problems, such as, but not limited to poor network connection, nodes that are down. In some embodiments, by identifying trends in retry rates and correlating retry rates with other metrics, a machine learning engine can not only identify an anomaly, but also diagnose a possible cause of the increase in retry rates. This information can be provided to the operator so that they can focus investigation on the proper area or functionality of the network, hence saving valuable time and resources. According to some embodiments, systems can be automatically reconfigured upon diagnosis of a problem in order to prevent further problems or remedy existing ones.

Call Data Record (CDR) Auditing:

In some embodiments, abnormalities in billing can indicate a problem associated with the function of a particular network node or with the billing system as a whole. Thus, billing, machine learning algorithms can be used to audit and look for any billing anomalies to avoid problems like revenue leak. Revenue leak can refer to the loss of revenue that could otherwise be generated where the loss occurs in a way that may not be easily tracked by humans. For example, a revenue leak could involve an instance where, for a user charged by the number of bytes used, the network fails to account for the total number of bytes used, which could be caused, for example, by a software or network error causing the record of bytes used to be lost. Resolving revenue leak involves identifying where the company is failing to collect money or where the company is losing money in a customer transaction. In one example, software defects introduced in a new billing software release can cause a subset of call data records to be mistakenly dropped from the database or the database never receiving the data in the first place due to a data leak. By observing, for example, the byte usage trend on a particular computing node, this kind of problem can be identified. Example machine learning techniques can detect such an anomaly in the usage pattern and notify the operator even if the trend is not yet apparent to human eyes. Other usage metrics in CDRs can be monitored to identify other types of anomalies.

Resource Usage:

In some embodiments, resource usage trends can indicate abnormalities and problems in a network. Internal resource usage can include, but not limited to CPU usage in a node, memory usage in a node, network link bandwidth usage across the entire network and/or for particular nodes. Such usage can be monitored for anomalies, such as spikes or atypical usage for a given time. Patterns can also be identified over time and across various usage types. Where abnormal patterns or events are observed, they can be correlated with other metrics quickly to determine a root cause. For example, a machine learning system can detect a CPU spike in conjunction with other abnormalities on the network, such as a jump in connection attempts and authentication errors. If the spike in CPU usage is correlated with the concurrent jump in connection attempts and jump in authentication errors, this correlation can be communicated to the operator, who can narrow down an investigation into the anomaly to possible hacking attempts. Thus, by correlating two abnormalities, the system can enable quick identification and resolution of network issues. Furthermore, some advanced machine learning algorithms can also assign probabilities to various possible root causes (e.g., the reason why an error or anomaly is occurring, such as a misconfiguration on the node or a hardware malfunction that causes a CPU spike) to the detected abnormalities, which can direct an operator's attention to potential causes or symptoms that are more statistically significant. For example, if a training set has a number of spikes from which to learn, the system can be configured to correlate causes across events that are more likely to have caused similar spikes.

Predicting Capacity Based on Real Call Model:

Currently operators assume a fixed capacity for each node on the network (e.g., how much data throughput a node can handle.) This capacity figure can be used for network planning to determine how many customers the network can serve, and when capacity is required, etc. When the network usage passes a threshold, such as 80% of the assumed capacity, then more network nodes may need to be added. However, in some embodiments, the capacity of a node may not be constant, and may instead be affected by various factors in the traffic model such as, but not limited to, average packet size, the number of packets to be processed per second, the rate in setting up and tearing down IP flows, etc. These factors can differ drastically between different markets, or even between different hours of a day. Machine learning can be used to constantly adapt the threshold to the prevailing traffic model (e.g., the way in which the network is configured) so that the thresholds can be set to levels that are neither too conservative nor too aggressive. Furthermore, anomalies in these estimated thresholds can be used to alert network operators to potential problems in the network.

FIG. 1 is a system block diagram of an architecture for implementing machine learning in a network, according to some embodiments. As shown in FIG. 1, the architecture includes an online system 100 and an offline storage and training function (OSTF) 112. Online system 100 can be implemented, for example, in an Affirmed Networks Mobile Content Cloud ("MCC"), which controls network traffic. Other implementations are possible in other network components or as a separate node between other network components, such as between a user equipment ("UE") and an Evolved Node B ("eNodeB"), between a Universal Mobile Telecommunications System ("UMTS") core network and one or more S or G gateways, or at any point in a Global System for Mobile Communications ("GSM"). The Online system 100 can include MCC data collection function 102, data parser 104, anomaly detection function (ADF) 106, anomaly classification function (ACF) 108, and action/automation engine 110. OSTF 112 includes data store 114 and machine learning training engine (MLTE) 116.

In some embodiments, online system 100 operates in real time to detect and classify anomalies inside the network. In some embodiments, the online system 100 can automatically take immediate actions if a problem in the system arises or alert network operators to an anomaly. MCC data collection function 102 receives MCC data, such as KPIs, logs and information how many packets were dropped, how many calls failed, etc. In some embodiments, collection can be automated, for example by running data collection scripts at each node or data query scripts at the MCC. In some embodiments data collection can occur on a predetermined time interval and/or when it is determined that data is stale. In some embodiments a network operator may initiate data collection from some or all nodes in the system. Collected data can be any data that describes the performance and activity of the system or a part thereof. MCC data is compiled by the MCC data collection function 102 using, for example, periodic measurements recorded by the software running on the MCC, such as data from logs and performance statistic counters. MCC data collection function 102 provides the MCC data to data parser 104. The data parser 104 parses the raw data from MCC 102 into the correct format. This can involve, for example, restructuring the data form (e.g., converting the data into CSV files from binary files), filtering out corrupted data, identifying and/or addressing missing fields. According to some embodiments, data parsing can include filtering the data to select only a subset of features for training and cross validating, removing corrupt data, etc. These features can be extracted as key performance indicators ("KPIs"). KPIs can include features such as, but not limited to, "Number of Total Created Sessions Accepted", "Number of Created Sessions Attempted", etc. These KPIs can be stored, for example, in a vector format. For example, KPIs can be bundled together in a network data vector (e.g., each KPI occupying a predetermined position as a component in a vector) with a timestamp indicating a range of one or more KPIs for a given time step (time period). The vector can be stored using any known computerized representation of a vector, such as, but not limited to a tuple of components, a line in a text file, a row in a spreadsheet, etc. In some embodiments, the data received by the data parser 104 can include time data for each feature, such as timing information from the network node from where the data was received or timing information about when the data was received by the online system 100. The data parser 104 can then determine a timestamp for the vector containing such data. For example, the timestamp can be selected as one or more of the earliest time associated with an element of the vector, the latest time associated with an element of the vector, a range of time associated with elements in the vector, or an average time associated with elements in the vector. Timestamping the network data vector in this fashion takes into account the fact that not all data that is compiled into a vector was produced or received at exactly the same time. These vectors can function as inputs to the ADF 106. The data parser 104 can then send the parsed data (for example, the vectors discussed above) to the ADF 106. It should be appreciated based on the present disclosure that other data structures can be implemented. In some embodiments, the data parser 104 is preconfigured by a network operator to parse data in a particular way and to output data using a data structure that can be read and used by other network components. According to some embodiments, data parser 104 also feeds some or all of the parsed data to data storage 114 in OSTF 112. ADF 106 is periodically provided with parameters for a machine learning model (MLM) from MLTE 116. According to some embodiments, data is provided to the ADF 106 in separate streams with each stream having data points associated with particular time steps. In some embodiments, a data stream can be configured to include only data associated with a particular system or subsystem, such as a particular node in the system or the billing system (or subset thereof). In some embodiments, data parser can include data from a particular node in multiple data streams. Each data stream can include a data stream identifier to indicate what type of data is included.

In some embodiments, ADF 106 receives each parsed data point from the data parser 104 and either flags the data point (e.g., the vector or pieces of data from individual streams) as anomalous or normal based on an MLM stored on the ADF 106 and associated parameters received from MLTE 116. In some embodiments, the ADF 106 can store a number of different MLMs, and will apply a particular MLM in accordance with or separate from the parameters received from the MLTE 116. In some embodiments, these MLMs can be preconfigured on the ADF 106 such that the MLTE 116 need only provide an indicator of a selected MLMs and associated parameters in order to deploy a new MLM. As discussed above, data points can include a network data vector that describes the state of the system or subsystem at the given time. In some embodiments involving separate data streams, the most recent data from each stream can be used at any given time. The output of the MLM can be a label affixed to the vector, such as anomalous or normal. In some embodiments, the label can also include an indication of a time interval in which the data was found to be anomalous, or an indication of other vectors that are associated with the same detected anomaly. As discussed in the examples above, anomalous data could include that which is part of a drastic increase or decrease from the previous time steps. In some embodiments, ADF 106 includes a data buffer (such as a moving window data buffer) that can analyze data over a large data window to identify anomalies on a longer time scale. In some embodiments, when an anomaly is detected, some or all of the data in the data buffer is labeled to be anomalous.

In some embodiments, if one or more data points is deemed anomalous by ADF 106, then the parsed data point(s) is provided to ACF 108. ACF 108 is periodically provided with parameters for a machine learning model (MLM) from MLTE 116 as discussed in more detail below. ACF 108 reviews the data point (and, according to some embodiments, previous data points) in order to classify the anomaly. ACF 108 classifies what type of anomaly was detected from the anomaly detection algorithm based on a stored MLM and the parameters provided by MLTE 116. In some embodiments, the ACF 108 can store a number of different MLMs, and will apply a particular MLM in accordance with the parameters received from the MLTE 116. In some embodiments, these MLMs can be preconfigured on the ACF 108 such that the MLTE 116 need only provide an indicator of a selected MLMs and associated parameters in order to deploy a new MLM. In some embodiments, the ACF 108 can identify the most probable causes of the anomaly. As discussed in more detail throughout the present disclosure, the MLM used by the ACF 108 can be trained on previous anomalous data for which causes were known. For example, an anomaly could be classified as a memory leak. The ACF 108 can periodically receive an updated MLM from the MLTE 116 as discussed in more detail below.

In some embodiments, action/automation block 110 determines whether to take an action, and if so, what action to take, based on the output of classification 108. Action/automation block 110 can take a number of actions such as, but not limited to attempting to fix the errors in the MCC, alerting operators of the detected anomaly, resetting routing protocols with a peer router, restarting a certain process running on a CPU, rebooting a virtual machine, etc. Action/automation block 110 can also provide information regarding the detected and/or classified anomalies and/or periodic reports to operators and/or a graphical user interface ("GUI") for inspection by an operator. In some embodiments, a report can include one or more of a ranking of the top potential root causes of the anomaly, weighted probabilities associated with potential root causes, the time frame of the anomaly, an identification of the system (or systems) affected by the anomaly, the source of the anomalous data, the anomalous data itself, a recommended solution, or recommended preventative measures to prevent or mitigate a problem associated with the detected anomaly.

In some embodiments, OSTF 112 includes data storage block 114 and MLTE 116. Data storage block 114 receives information from data parser 104 and stores received data. As discussed above, the data can be received by a data parser 104, which formats data for both detection at ADF 106 and for storage in data storage 114. Accordingly, data can be provided as a vector, as a stream, or in any other suitable formats to the data storage 114. The data can be stored, for example, as structured data (e.g., CSV files or tables) which are used for the training and updating of the MLMs for ADF 106 and ACF 108. The MLM is updated periodically offline by the MLTE 116 based on the newly received data to ensure that the MLM is trained with the newest data from the network. The offline updating of the MLM can occur at a time specified by the operator, for example at a time when network resources are at a minimum or at a time at which the operator has determined the previous data is "stale" (e.g., no longer an accurate representation of the network due, for example, to changes in the network). According to some embodiments, this is accomplished by sending the contents of the stored data (or subsets thereof) from data storage 114 to training models in the MLTE 116, and then sending that updated MLM to the ADF 106 and ACF 108. In some embodiments, the stored data is sent from the ADF 106 or requested from the ADF 106 by the ACF 108 in time intervals provisioned by a network operator. In some embodiments the time intervals are specific to each data stream and may differ among data streams depending on operator preference. MLTE 116 performs computations to train MLMs for ADF 106 and ACF 108. These computations include optimization functions which are used to tune the machine learning parameters. MLTE 116 can have access to some or all of the data or just parts of the data, depending on the implementation, in order to optimize the MLM for the best performance. After updating the MLM, the MLTE 116 can feed the online ADF 106 and ACF 108 with updated or new MLMs in order to ensure that those algorithms remain current. In some embodiments, MLMs can be based on one or more supervised learning (e.g., Naïve Bayes, K-Nearest Neighbor, or Support Vector Machines) or unsupervised learning models (e.g., Clustering).

MLTE 116 can train one or more machine learning models on the data in data storage 114 in accordance with instructions provided by a network operator. For example, a network operator may specify a particular MLM type or types to be trained on specific types of data in data storage 114. The MLM provided to ADF 106 can include one or more anomaly detection models each configured to monitor one or more parameters and indicate whether the parameters are anomalous. Exemplary anomaly detection techniques are described in Hochenbaum et al., "Automatic Anomaly Detection in the Cloud Via Statistical Learning," arXiv: 1704.07706 (Submitted Apr. 24, 2017), available at: https://arxiv.org/pdf/1704.07706.pdf. A person of skill in the art would understand based on the present disclosure that the type of MLM or types of MLMs used in the ADF 106 are not limiting. According to some embodiments, ADF 106 contains the same MLMs as the MLTE 116 and is simply passed an update message newly trained or updated parameters periodically from the MLTE 116. In some embodiments, parameters can be implemented as numbers indicating weights to be applied in an existing MLM in the ADF 106. Accordingly, ADF 106 does not need to be reconfigured each time a new MLM is made available by the MLTE 116. Instead, ADF 106 updates a list or lists of parameters for applying anomaly detection algorithms, which drastically reduces the amount of time required to apply an updated MLM. In some embodiments, both the ADF 106 and MLTE 116 can have predefined MLM types stored thereon, and parameters in an update message can be used to indicate one or more of what MLM type is to be applied by the ADF 106, what KPIs are to be included when applying the MLM of the indicated type, and what weights or other parameters are to be applied in implementing the indicated MLM type on the indicated KPIs.

Similarly, MLTE 116 can train one or more MLMs on the data in data storage 114 for creating a model for anomaly classification. These can be trained on anomalies identified by the anomaly detection MLM discussed above. The MLM provided to ACF 108 can include one or more anomaly classification models configured classify causes, types, locations, or other characteristics of detected anomalies. Exemplary machine learning techniques that can be employed to classify anomalies include, but are not limited to, K-Nearest Neighbor, Support Vector Machines, Naive Bayes, spectral or K-means clustering, etc. Such techniques can be supervised or unsupervised. A person of skill in the art would understand based on the present disclosure that the type of MLM or types of MLMs used in the ACF 108 are not limiting. According to some embodiments, ACF 108 contain the same MLMs as the MLTE 116 and is simply passed an update message containing newly trained or updated parameters periodically from the MLTE 116. In some embodiments, parameters can be implemented as numbers indicating weights to be applied in an existing MLM in the ACF 108. Accordingly, ACF 108 does not need to be reconfigured each time a new MLM is made available by the MLTE 116. Instead, ACF 108 updates a list or lists of parameters for applying anomaly classification algorithms, which drastically reduces the amount of time required to apply an updated MLM. In some embodiments, both the ADF 106 and MLTE 116 can have predefined MLM types stored thereon, and parameters in an update message can be used to indicate one or more of what MLM type is to be applied by the ACF 108, what KPIs are to be included when applying the MLM of the indicated type, and what weights or other parameters are to be applied in implementing the indicated MLM type on the indicated KPIs.

Figure 4:
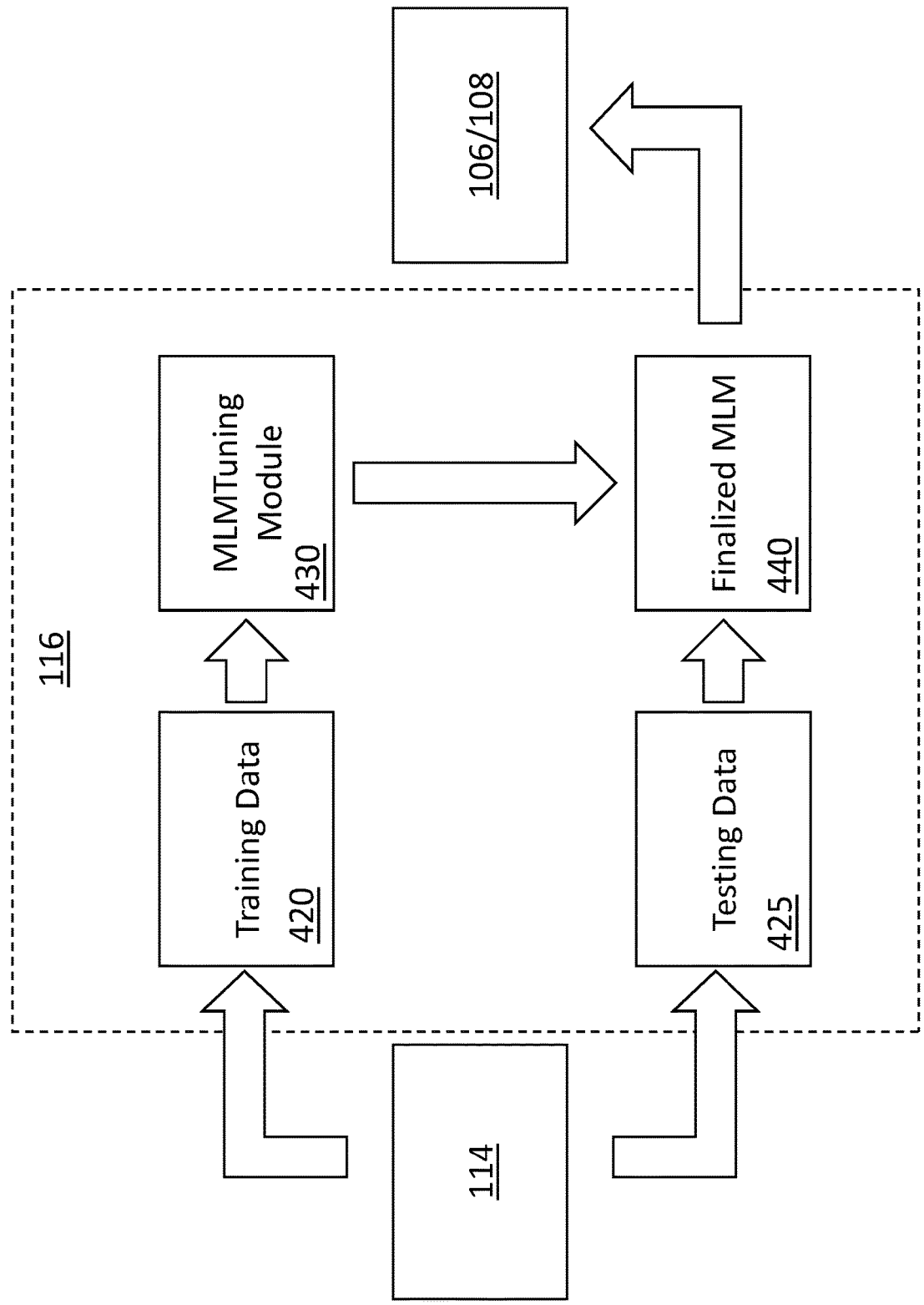
FIG. 4 is a block diagram of an exemplary machine learning training engine.

FIG. 4 shows a more detailed block diagram of MLTE 116, according to some embodiments. As discussed above, the MLTE 116 receives data from the data storage 114, which stores parsed data from the data parser 104 regardless of whether it is anomalous or not. In some embodiments, either the data storage 114 or the MLTE 116 can separate out this data into training data 420 and testing data 425 as described in more detail below. As shown in FIG. 4, MLTE 116 can use both training data 420 and testing data 425 and use an MLM tuning module 430 to train and cross-validate a finalized MLM module 440. Training data 420 and testing data 425 can be separated arbitrarily in such a way that there is sufficient data to both train and test the resulting MLM. In some non-limiting examples, the data can be separated into 80% training data and 20% testing data or any other distribution. In some embodiments, the split of data may depend on one or more of the amount of stored data, the MLM model, etc. The MLM tuning module 430 can then update one or more parameters of one or more MLMs (e.g., detection or classification MLMs) on the training data 420. In some embodiments, the MLM tuning module 430 updates parameters of a detection MLM to identify statistically significant anomalies. In some embodiments, a network operator can conduct analysis on the training and/or testing data 420/425 in order to identify particular anomaly types. In some embodiments, a network operator receives information about anomalous data from the MLM tuning module 430 and provides back classifications of each anomaly. Information about where in the training and/or testing data 420/425 particular anomaly types can be found can be fed to MLM tuning module 430 in order to train MLMs to classify particular anomalies and to test the same. The MLM tuning module then passes the updated MLM(s) (e.g., via sending updated parameters) to the finalized MLM module 440. Finalized MLM module 440 receives both the updated MLM and the testing data and tests the updated MLM on the testing data to cross-validate. This process can then be repeated based on different slices of data (e.g., splitting the data in data storage 114 along different lines to form training data 420 and testing data 425 to ensure that the updated MLM works properly across all data slices).

According to some embodiments, online system 100 does not need to possess a large dataset of tracked network variables spanning a long period of time. Instead, online system 100 can use only the real-time data produced from the MCC. MLM training and data storage can be accomplished offline (for example, not in the MCC) in the OSTF 112. This reduces memory usage and the number of computations required in real-time. Thus, in some embodiments, the system of FIG. 1 creates a more spatially and computationally efficient MCC. Furthermore, because MLM updating can be performed offline and outside of the regular function of the online network 100 and then provided later to the online network 100, for example by transmitting a simple set of parameters, network operators are afforded greater control over how MLM updates are applied. For example, the network operator can first test an updated MLM before applying it. In another example, the network operator can dedicate a smaller amount of resources to MLTE 116, and therefore choose to apply MLM updates less frequently. In another example, because the online portion 100 of the network is agnostic to the particular MLM that is applied, new MLM can be easily swapped in without significant adjustments to the online network, for example by adjusting parameters in the MLM stored in one of ADF 106 or ACF 108 based on a message received form the MLTE 116.

Figure 2:
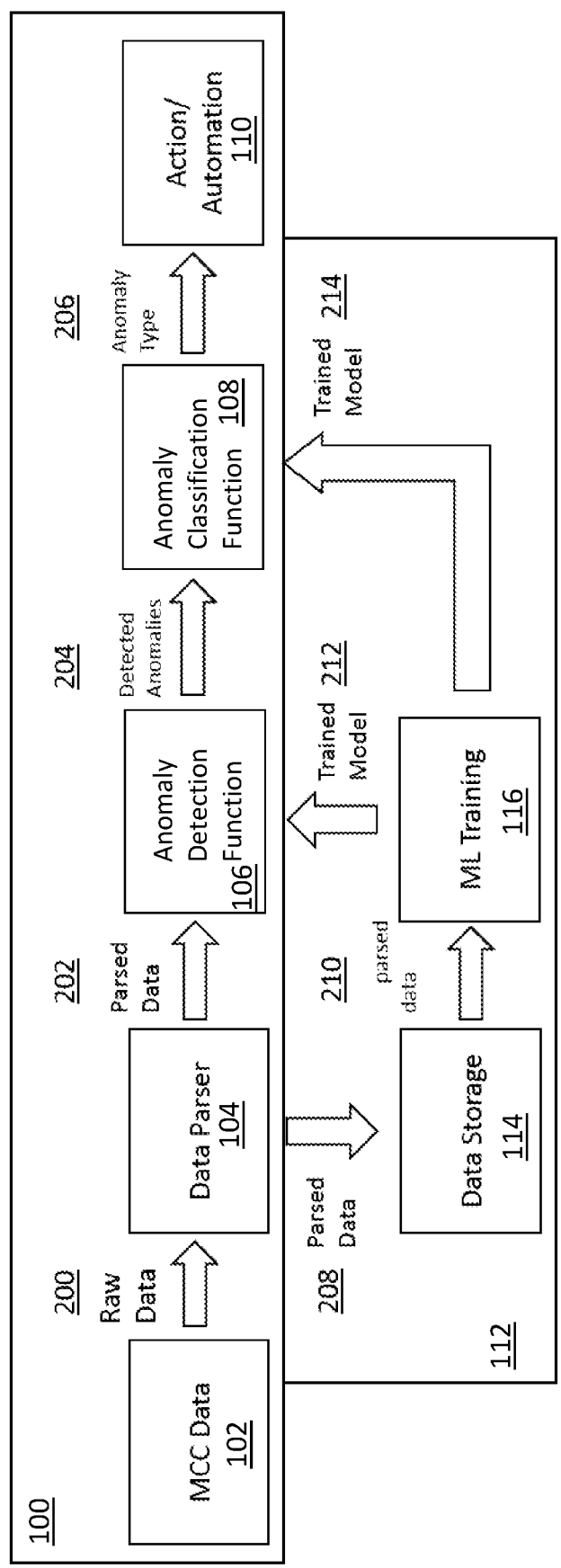
FIG. 2 is a block diagram of exemplary communications and flows of data through the system of FIG. 1, in accordance with some embodiments of the disclosed subject matter.

FIG. 2 illustrates exemplary communications and flows of data through the system of FIG. 1, according to some embodiments. As shown in FIG. 2, MCC data collection function can provide real-time raw data 200, which can be used for the detection and classification. According to some embodiments, the raw data 200 arrives in any suitable form, such as a continuous flow, packets, etc. Each data point can represent a time step with associated information for that time step. The raw data 200 contains information on the systems or MCC's given state, and its performance statistics as discussed above. If the system is in a running step, the performance statistics can include things such as the features previously described above (for example, Number of subscribers, etc.). For each new time step, it can be desirable to parse the data into parsed data 202, as discussed above. In some embodiments, parsing is performed quickly and in real time to allow for anomalies to be detected and resolved with very minimal latency. The parsed data 202 can include data points to be sent to the ADF 106. Other sets of parsed data 208 can be sent to the data storage which contains a collection of previous data. According to some embodiments, the parsed data 208 is the same as the parsed data 202, while in other embodiments, the data may be parsed differently. The parsed data 202 can be used as a test point in the ADF 106 to determine if there is an anomaly inside the system. The ADF 106 determines whether or not parsed data 202 is anomalous. If parsed data 202 is deemed anomalous then it can be classified as anomalous data 204, which in some embodiments contains all the same information as parsed data 202 but with an indication, such as a tag or flag that the data is anomalous. Anomalous data 204 is provided to the ACF to be tested to determine the anomaly type using, for example, an MLM. According to some embodiments, additional data from a time step prior to the detected anomaly can also be provided to the ACF 108 where the MLM can use both detection of an anomaly type and the characteristics that brought about that detection in order to classify the detected anomaly. However, such data is not required for the ACF 108 to classify anomalies. The anomalous data 204 is processed by the ACF 108, which in some embodiments can identify of one or more probable causes or anomaly types 206 for the anomaly.

In some embodiments, the parsed data 208 sent to data storage 114 can be stored and periodically provided to MLTE 116 as parsed data 210 to train the anomaly detection and classification algorithm to develop better MLMs. According to some embodiments, only recent subsets of the stored data in data storage 114 are provided as parsed data 210 to the MLTE 116 in ordered to update the MLMs. According to some embodiments, the entire collection of past data in data storage 114 is provided as parsed data 210 is provided to the MLTE 116 to train the anomaly detection and classification algorithm.

As discussed above, the trained models 212 and 214 (i.e., one or more MLMs) can include the weights or parameters used to define the detection/classification algorithms. When training and cross-validating each MLMs (e.g., using only a portion of a training data set to train the MLM, and then running the MLM on the remaining data to determine validity of the tuned parameters and then repeating for difference slices of the data), the MLTE 116 can obtain optimal weights and parameters that are necessary for detecting and classifying parsed data 202 in real time. Finding these weights and parameters can involve heavy computation. Accordingly, as discussed above, it is beneficial to accomplish this task offline via the offline components 112. According to some embodiments, the one or more MLMs are only periodically updated in order to take into account changes in the behavior of the system or new anomalous trends across the data. Once the weights and parameters for the one or more MLMs are computed, those weights and parameters can be provided to the ADF 106 and ACF 108 for detection and classification MLMs, respectively, in lightweight updates so ADF 106 and ACF 108 can to quickly make the detection and classification in the real-time online system. Thus, once training and cross validation has been accomplished on an MLM to populate the trained models 212 and 214, those models 212 and 214 can be quickly sent to the ADF and ACF, respectively for immediate implementation. By separating anomaly detection and classification MLMs, the system can become more sensitive to various anomalies even where they cannot be classified into a known anomaly type. In a simplified example, if the system only looks for memory leaks and hacking incidents, it may miss other anomalies that don't fall into these two groups, such as errors in newly installed software. Accordingly, training and employing separate anomaly detection and classification MLMs can better detect problems before they become significant, even where the cause or type is unknown.

Use cases involve detecting and classifying abnormal CPU spikes, jumps in memory utilization, a change in CPU patterns, and jumps in latency all within a short period of time. In this way this system can make network monitoring more intelligent and automated to save time and human resources and to increase accuracy and responsiveness.

Figure 3:
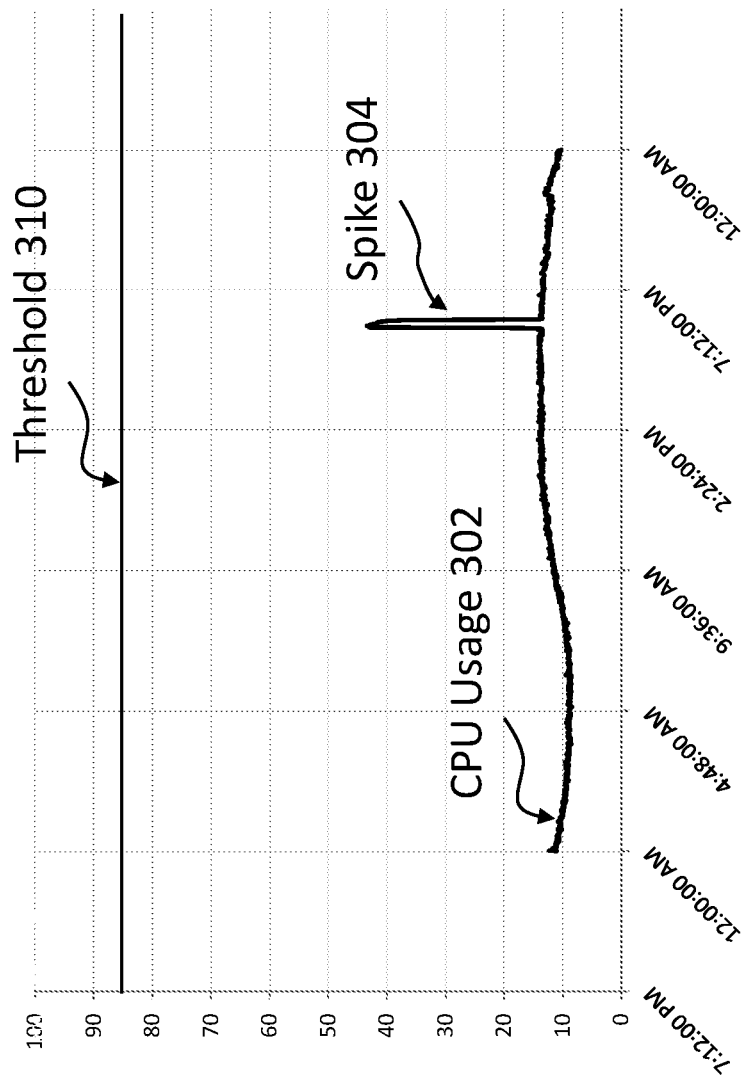
FIG. 3 is a graphical representation of an exemplary anomaly, in accordance with some embodiments of the disclosed subject matter.

FIG. 3 is a graphical representation of an exemplary anomaly that can be detected and classified according to the systems and methods discussed in the present disclosure. FIG. 3 shows CPU usage percentage 302 for a network element (vertical axis) as a function of time (horizontal axis). As shown in FIG. 3, the usage can vary as a function of time of day or other factors. For example, usage can be seasonally impacted or impacted by recurring events, which can be taken into account by correlating various parameters such as date and CPU usage.

As shown in FIG. 3, CPU usage 302 has an anomaly in the form of a spike 304. While anomaly detection via thresholding, such as a threshold 310 at 85%, can catch some anomalies in CPU usage 302, thresholding will not always catch CPU usage spikes, such as CPU spike 304. However, as discussed above, the ADF 106, which contains a model 212 trained on historical data, can more easily detect anomalies such as spikes based on a deeper understanding of historical trends. Furthermore, because the detection and classification of anomalies are split between ADF 106 and ACF 108, the system can better determine that an anomaly exists even if there isn't an explanation. After detecting the data spike 304, the ADF 106 can pass information about the data spike 304 to the ACF 108 in order to classify the type or cause of the anomaly. This information can include, for example, ACF 108 can recognizing the CPU spike 304 based on characteristics such as timing, shape, amount, etc. and/or identifying a cause, such as a virus, jammed process, irregular traffic, or any other types of CPU causes. However, even if ACF 108 does not have an adequate classification, the anomaly can still be forwarded to action/automation block 110 and then to a network operator for further investigation. According to some embodiments, other anomalies can include, but are not limited to jumps in certain metrics, slow increases certain metrics that deviate from typical patterns, daily fluctuations that do not fit typical patterns, and adaptive thresholds that are particularized for individual network elements.

Returning to FIGS. 1 and 2, ACF 108 can communicate with action/automation block 110 and communicate an anomaly type 206 (or, in the event that no classification is available, simply an anomaly indication). Anomaly type 206 can include additional data about the anomaly, such as the detected anomaly 204. Action/automation block 110 can take appropriate actions, which can include, but are not limited to alerting a system operator or the appropriate individual to resolve an identified problem (e.g., via an alarm in a Simple Network Management Protocol (SNMP)), restarting network elements, reducing traffic to certain parts of the network, and making adjustments in a command line interface.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, can readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter can be made without departing from the spirit and scope of the disclosed subject matter, which is limited only by the claims which follow.

The invention claimed is:

1. A method comprising:
receiving, at an online computing node, network data from a plurality of nodes in the networked system, the network data comprising information about performance of the networked system;
parsing, by the online computing node, the received network data into at least one network data set, the parsing the network data comprising:
identifying, by the online computing node, at least one subset of the received network data based on at least one parsing criteria,
for each of the at least one subset of the received network data, packaging, by the online computing node, the subset of the received network data as components of the at least one network data set, and
associating the at least one network data set with at least one timestamp;
detecting in real time, by an anomaly detection function ("ADF") in the online computing node, whether data packaged in the at least one network data set is anomalous based on at least one anomaly detection model, the at least one anomaly detection model comprising:
at least one detection machine learning model stored in the online computing node, and
at least one set of anomaly detection parameters associated with the at least one detection machine learning model;
tagging the at least one network data set containing anomalous data with an anomaly tag;
providing, to an online anomaly classification function ("ACF") in the online computing node, the at least one tagged network data set;
determining in real time, by the ACF, if the at least one tagged network data set matches an anomaly type based on at least one anomaly classification model, the at least one anomaly detection model comprising:
at least one classification machine learning model stored in the online computing node, and
at least one set of anomaly classification parameters associated with the at least one classification machine learning model;
periodically transmitting, by the online computing node, the at least one network data set to an offline storage and training function (OSTF);
storing, by the OSTF, the at least one network data set from the online computing node;
periodically training, by a machine learning training engine (MLTE) in the OSTF, one or more of at least one updated anomaly detection model on the at least one stored network data set to identify at least one set of updated anomaly detection parameter or at least one updated anomaly classification model on the at least one stored network data set to identify at least one set of updated anomaly classification parameters; and
providing an update message to the online computing node, the update message comprising one or more of:
instructions to the ADF to replace the at least one set of anomaly detection parameters with the at least one set of updated anomaly detection parameters, or
instructions to the ACF to replace the at least one set of anomaly classification parameters with the at least one set of updated anomaly classification parameters.

2. The method of claim 1, wherein the instructions to the ADF to replace the at least one set of anomaly detection parameters with the at least one set of updated anomaly detection parameters comprises the at least one set of updated anomaly detection parameters, wherein the update message does not contain a detection machine learning model.

3. The method of claim 1, wherein the instructions to the ACF to replace the at least one set of anomaly classification parameters with the at least one set of updated anomaly classification parameters comprises the at least one set of updated anomaly classification parameters, wherein the update message does not contain a classification machine learning model.

4. The method of claim 1, further comprising:
storing, at the online computing node, one or more of a plurality of generic detection machine learning models or a plurality of generic classification machine learning models; and
wherein the update message further comprising one or more of:
instructions to the ADF to utilize at least one of the stored generic detection machine learning models of the stored generic detection machine learning models in place of the at least one detection machine learning model, or
instructions to the ADF to utilize at least one of the stored generic classification machine learning models of the plurality of the stored generic classification machine learning models in place of the at least one classification machine learning model.

5. The method of claim 1, further comprising cross-validating the at least one set of updated anomaly detection parameters and the at least one set of anomaly classification parameters based on at least a portion of the at least one network data set stored by the OSTF.

6. The method of claim 1, wherein one or more of the at least one detection machine learning model and the at least one classification machine learning model comprises one or more of a K-Nearest Neighbor, Support Vector Machines, Naive Bayes, clustering, or K-means clustering model.

7. The method of claim 1, wherein the ACF is further configured to provide information about at least one of the detected at least one tagged network data set and the determined anomaly type to an action block, the action block being configured to perform at least one of a network adjustment or a notification to a system operator.

8. The method of claim 1, wherein the OSTF is remote from the online computing node.

9. The method of claim 1, further comprising transmitting, to at least one network operator, an anomaly report based on one or more of the at least one tagged network data set or the determined anomaly type.

10. The method of claim 1, wherein the at least one network data set comprises at least one network data vector.

11. A system comprising:
an online computing node in a networked system comprising an anomaly detection function (ADF) and an anomaly classification function (ACF), the online computing node configured to:
receive network data from a plurality of nodes in the networked system, the network data comprising information about performance of the networked system;
parse, by the online computing node, the received network data into at least one network data set, the parsing the network data comprising:
identify, by the online computing node, at least one subset of the received network data based on at least one parsing criteria,
for each of the at least one subset of the received network data, package, by the online computing node, the subset of the received network data as components of the at least one network data set, and
associate the at least one network data set with at least one timestamp;
detect in real time, by the ADF, whether data packaged in the at least one network data set is anomalous based on at least one anomaly detection model, the at least one anomaly detection model comprising:
at least one detection machine learning model stored in the online computing node, and
at least one set of anomaly detection parameters associated with the at least one detection machine learning model;
tag the at least one network data set containing anomalous data with an anomaly tag;
provide, to the ACF, the at least one tagged network data set;
determine in real time, by the ACF, if the at least one tagged network data set matches an anomaly type based on at least one anomaly classification model, the at least one anomaly detection model comprising:
at least one classification machine learning model stored in the online computing node, and
at least one set of anomaly classification parameters associated with the at least one classification machine learning model;
periodically transmit, by the online computing node, the at least one network data set to at least one offline storage and training function (OSTF);
the OSTF comprising a machine learning training engine (MLTE), the OSTF configured to:
receive the at least one network data set from the online computing node;
store the at least one network data set from the online computing node;
periodically train, by the MLTE, one or more of at least one updated anomaly detection model on the at least one stored network data set to identify at least one set of updated anomaly detection parameter or at least one updated anomaly classification model on the at least one stored network data set to identify at least one set of updated anomaly classification parameters; and
provide an update message to the online computing node, the update message comprising one or more of:
instructions to the ADF to replace the at least one set of anomaly detection parameters with the at least one set of updated anomaly detection parameters, or
instructions to the ACF to replace the at least one set of anomaly classification parameters with the at least one set of updated anomaly classification parameters.

12. The system of claim 11, wherein the instructions to the ADF to replace the at least one set of anomaly detection parameters with the at least one set of updated anomaly detection parameters comprises the at least one set of updated anomaly detection parameters, wherein the update message does not contain a detection machine learning model.

13. The system of claim 11, wherein the instructions to the ACF to replace the at least one set of anomaly classification parameters with the at least one set of updated anomaly classification parameters comprises the at least one set of updated anomaly classification parameters, wherein the update message does not contain a classification machine learning model.

14. The system of claim 11, wherein the online computing node is further configured to:
store one or more of a plurality of generic detection machine learning models or a plurality of generic classification machine learning models; and
wherein the update message further comprising one or more of:
instructions to the ADF to utilize at least one of the stored generic detection machine learning models of the stored generic detection machine learning models in place of the at least one detection machine learning model, or
instructions to the ADF to utilize at least one of the stored generic classification machine learning models of the plurality of the stored generic classification machine learning models in place of the at least one classification machine learning model.

15. The system of claim 11, wherein the OSTF is further configured to cross-validate the at least one set of updated anomaly detection parameters and the at least one set of anomaly classification parameters based on at least a portion of the at least one network data set stored by the OSTF.

16. The system of claim 11, wherein one or more of the at least one detection machine learning model and the at least one classification machine learning model comprises one or more of a K-Nearest Neighbor, Support Vector Machines, Naive Bayes, clustering, or K-means clustering model.

17. The system of claim 11, wherein the ACF is further configured to provide information about at least one of the detected at least one tagged network data set and the determined anomaly type to an action block, the action block being configured to perform at least one of a network adjustment or a notification to a system operator.

18. The system of claim 11, wherein the OSTF is remote from the online computing node.

19. The system of claim 11, wherein the online computing node is further configured to transmit, to at least one network operator, an anomaly report based on one or more of the at least one tagged network data set or the determined anomaly type.

20. The system of claim 11, wherein the at least one network data set comprises at least one network data vector.

* * * * *